United States Patent [19]

Frazier et al.

[11] 4,358,675
[45] Nov. 9, 1982

[54] LOW CONTRAST DEFAULT FOR AUTO FOCUS SYSTEM

[75] Inventors: James H. Frazier, Aurora; John C. Wittenberger, Littleton, both of Colo.

[73] Assignee: Honeywell Inc., Minneapolis, Minn.

[21] Appl. No.: 213,437

[22] Filed: Dec. 5, 1980

[51] Int. Cl.³ .............................................. G01J 1/36
[52] U.S. Cl. ..................................... 250/204; 354/25
[58] Field of Search ........... 250/201, 204, 209, 214 R; 354/25, 31; 356/1, 4

[56] References Cited

U.S. PATENT DOCUMENTS 4,250,377  2/1981  Wilwerding ........................ 250/204
4,309,603  1/1982  Stauffer ................................ 354/25

*Primary Examiner*—David C. Nelms
*Attorney, Agent, or Firm*—Charles J. Ungemach

[57] ABSTRACT

Apparatus for use with range finding equipment in which the radiation from a remote object may be too small to provide for proper operation. A signal which is a function of the logarithm of the ratio of the output of a first and second detector and a signal which is the function of the logarithm of the ratio of a third and fourth detector is compared with a reference signal. If the reference signal is larger than both of the other signals, the system operates to focus at a predetermined position.

9 Claims, 4 Drawing Figures

LOW CONTRAST DEFAULT FOR AUTO FOCUS SYSTEM

BACKGROUND OF THE INVENTION

In a copending application of Norman L. Stauffer, Ser. No. 85,821, filed Oct. 17, 1979, now U.S. Pat. No. 4,309,603 a low cost auto focus system is disclosed in which as few as two radiation responsive detector pairs are utilized thus avoiding the necessity for a large and costly detector array that had been common in the prior art at that time.

In a copending application of Dennis J. Wilwerding, Ser. No. 99,235, filed Nov. 30, 1979, now U.S. Pat. No. 4,309,603 an improvement on this basic low cost auto focus system was disclosed in which a bias signal was introduced to prevent improper zero crossover situations that could occur during very low contrast conditions.

In copending application of J. Frazier, Ser. No. 212,930, filed Dec. 4, 1980, an improved low cost auto focus system is disclosed which examined the absolute values of log $a_1/b_1$ and log $a_2/b_2$, where $a_1$, $b_1$, $a_2$ and $b_2$ are the output signals from the detectors and, upon determining the largest absolute value, causes the auto focus circuitry to respond to the largest log signal. As part of the circuitry discussed in that application, a default circuit is disclosed which operates to stop the focus lens at the infinity or hyperfocal extension point when the scene being viewed has too little contrast to produce a satisfactory focus signal.

In a copending application of John Wittenberger, Ser. No. 212,918, filed on Dec. 4, 1980, a further improved low cost auto focus system is disclosed which involves a comparison of the absolute magnitude of log $a_1/b_1$ + log $a_2/b_2$ with the absolute magnitude of log $a_2/b_2$ − log $a_1/b_1$ where $a_1$, $b_1$, $a_2$ and $b_2$ are the output signals from the two pairs of radiation detectors. As part of the circuitry discussed in that application, a default logic circuit similar to that disclosed in the above-mentioned copending application Ser. No. 212,930 is disclosed which also operates to prevent the system from operating normally in the event that there is insufficient contrast.

SUMMARY OF THE INVENTION

The apparatus of the present invention comprises the default logic circuit disclosed and used with the above-mentioned copending applications Ser. No. 212,918 and Ser. No. 212,930 and more particularly involves a logic circuit for determining when the magnitude of the signals from the individual radiation detector elements is insufficiently large to provide an adequate signal for determining the proper focus position and providing a signal used by the circuit when such low contrast situation occurs to cause the focus and taking lenses of the camera to stop at the infinity position or preferably the hyperfocal extension, when low contrast exists. The invention includes a novel concept of positioning the focus lens initially closer to the camera than the infinity position so that a more accurate indication of the slope of the auto focus output curves may be obtained before the auto focus system operates.

DETAILED DESCRIPTION OF THE PREFERRED EMBODIMENT

Figure 1:
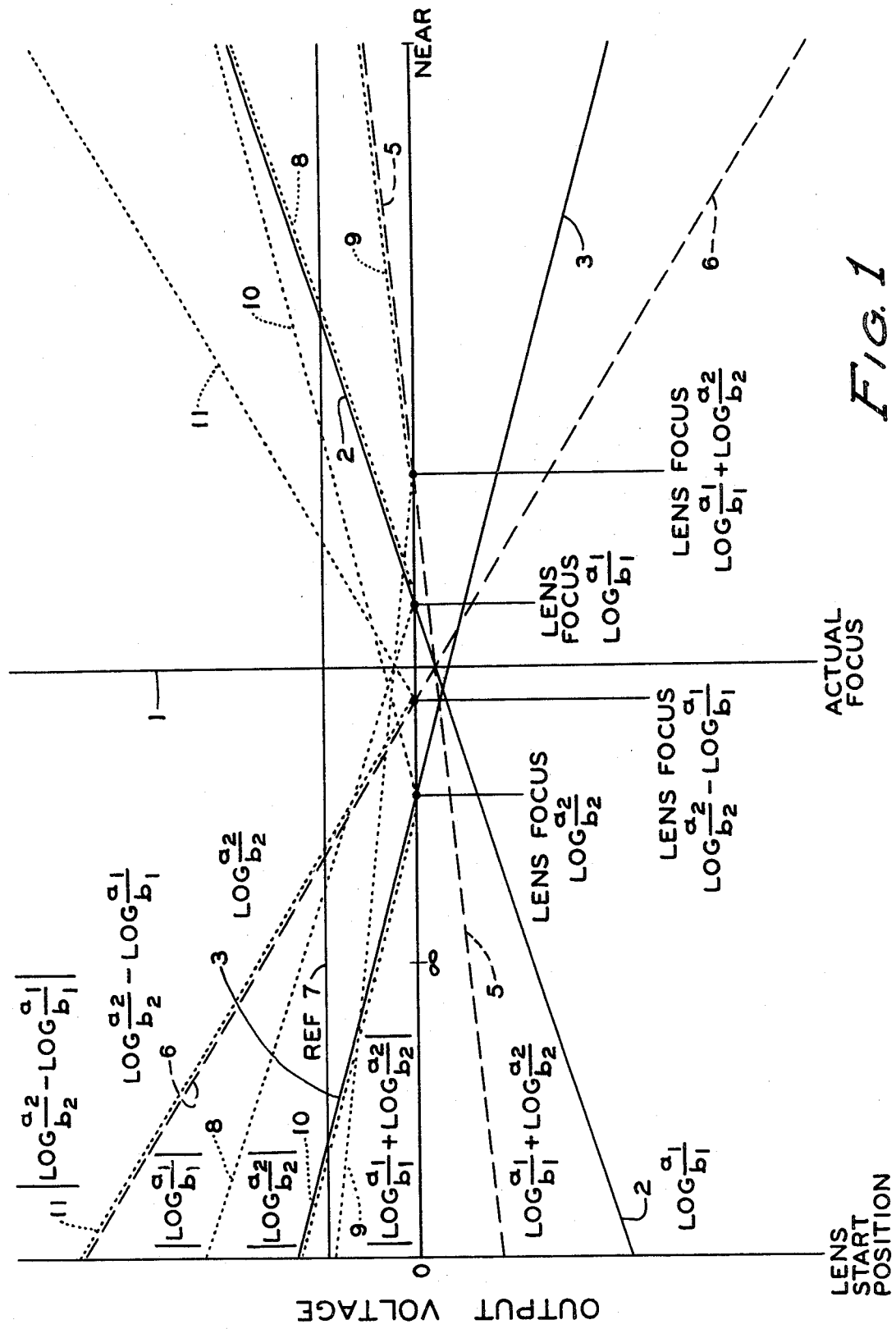
FIG. 1 shows a graph of the various signals involved in the auto focus circuitry with which the present invention is to be used.

In FIG. 1, the output values of various signals are plotted as a function of the focus lens extension described in the above-referred to copending applications from a position beyond infinity on the left to "near" on the right, a vertical line 1 represents an assumed actual best focus position. A solid line 2 representing an assumed value for log $a_1/b_1$ is shown extending from a negative value on the left through zero near the actual best focus line 1 to a positive value on the right. This curve, as with the other curves shown in FIG. 1, is shown as a straight line for convenience but in actual practice they may have some curvature. A solid line 3 representing an assumed value for log $a_2/b_2$ is shown extending from a positive value on the left through a zero crossover point also near the actual best focus line 1 to a negative value on the right. If everything were perfectly matched, the two zero crossover points for curves 2 and 3 would coincide at the actual best focus line 1 but because of mismatch of components, they will normally not do so. While line 2 has been shown starting negative on the left and line 3 shown starting positive on the left, both could be on the same side of zero or opposite to the way they are shown. It should be noted that the line with the greatest slope, line 2, reaches the zero crossover point closer to the actual best focus line 1 than does line 3. Since the electrical error is in volts, the greater the slope, the more closely the zero crossover point will be to the actual best focus point. Accordingly, in copending application Ser. No. 212,930, the circuitry operates to select either log $a_1/b_1$ or log $a_2/b_2$ which ever has the largest slope (in FIG. 1 it would be log $a_1/b_1$) to control the auto focus circuitry. It should be noted that if the signals represented by lines 2 and 3 are of the same sign and are added, there would be even greater slope and greater accuracy. However, if, as in FIG. 1, signs of the signals are opposite, adding them will produce a less accurate output. In such case, the better signal would be the difference between the signals represented by lines 2 and 3. In copending application Ser. No. 212,918, the circuitry operates to select either log $a_1/b_1$ + log $a_2/b_2$ or log $a_2/b_2$ − log $a_1/b_1$ whichever is largest (in FIG. 1 it would be log $a_2/b_2$ − log $a_1/b_1$) to control the auto focus circuitry.

A dashed line curve 5 is shown in FIG. 1 representing the sum log $a_1/b_1$ + log $a_2/b_2$ and it is seen to have less slope than either curve 2 or 3 and to cross the zero axis further away from the actual best focus line 1.

A dash curve 6 is also shown in FIG. 1 representing the difference log $a_2/b_2$ − log $a_1/b_1$ and it is seen that this line has greater slope than either line 2 or line 3 and crosses the zero axis nearer to the actual best focus position 1. Throughout the description the difference value will be described as log $a_2/b_2$ − log $a_1/b_1$ although it is equally possible to use the expression log $a_1/b_1$ −log $a_2/b_2$ to represent the difference value. At any rate, it is seen to be desirable in this case to utilize curve 6 to determine where the zero crossover point is for purposes of stopping the camera lens.

A reference voltage shown as solid line 7 is seen in FIG. 1 above and parallel to the zero axis. The reference voltage 7 represents the value, at the starting position of the lens, below which the curves would have too little slope indicating that there is insufficient contrast to accurately determine best focus.

The circuitry of the present invention determines whether there is sufficient contrast by taking the absolute value of the signals, either log $a_1/b_1$ and log $a_2/b_2$ or log $a_1/b_1$ +log $a_2/b_2$ and log $a_2/b_2$ −log $a_1/b_1$ and comparing them with the reference voltage. If both of the absolute value signals are below voltage at the starting position of the lens, the system will operate to position the lens at the infinity position, or preferably, the hyperfocal extension. In FIG. 1, dotted line 8 is shown representing the absolute value of log $a_1/b_1$ and a dotted line 9 is shown representing the absolute value of log $a_1/b_1$ +log $a_2/b_2$ and it is seen that at the lens start position, line 8 is clearly above the reference voltage while line 9 falls below the reference voltage and thus would not be useable to determine best focus position. Dotted line 10 is also shown in FIG. 1 representing the absolute value of log $a_2/b_2$ and dotted line 11 is shown representing the absolute value of log $a_2/b_2$ −log $a_1/b_1$. At the lens start position, lens 10 is a little above the reference value 7 and line 11 is well above the reference value 7. In operation, the system of copending application Ser. No. 212,930 would choose line 2 to control the operation of the focus circuitry and in copending application Ser. No. 212,918 the system would choose line 11 to control the operation of the auto focus circuitry. Of course, all lines may fall above the reference value in which case the system will still pick the largest value or the largest sum or difference signal for use by the focus circuitry but if neither fall above the reference value, the system will "default" and cause the lens to stop at the infinity or hyperfocal distance. The present invention may also be used if only a single pair of sensors is employed by comparing a value desired from the slope of the curve produced, such as log $a_1/b_1$, with a reference voltage and causing the system to default if such curve is below the reference value at the initial starting position. Also, three or more detector pairs may be used with the circuitry of the present choosing the one which had the maximum slope.

An important feature of the present invention lies in the positioning of the focus lens so that it starts at a position where it would focus on an object further than infinity. This feature produces a value where a curve intersects the vertical axis on the left side of FIG. 1 which is larger than the value would be if the vertical axis were at the infinity position. This allows a determination of contrast, which is really a function of the slope of the curves, to be made before the curves have decreased to a point where their values are not as large. While an actual measurement of slope might be better for determining contrast sufficiency, the circuitry required would increase the expense and complexity of the circuit. Accordingly, using a value of a curve at a predetermined point beyond infinity has been found sufficiently accurate for low cost camera purposes since the curves are fairly straight lines. Better accuracy is also obtained by moving the start position of the lens further in back of the infinity position but practical problems in the amount of lens motion permitted require a compromise position such as is shown by the vertical axis at the left side of FIG. 1. Although the infinity position is shown in FIG. 1 about one quarter of the way across the graph, the distance between the lens start position and the infinity position may conveniently be about one half or more of the distance between infinity and "near".

Figure 2:
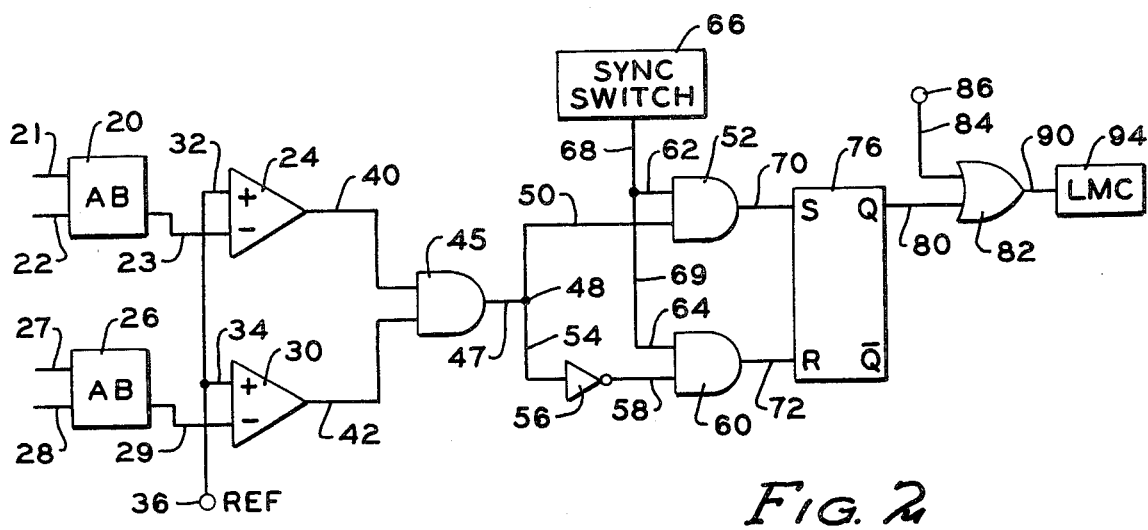
FIG. 2 shows a schematic diagram of one embodiment of the circuit of the present invention.

In FIG. 2, an absolute value circuit 20 is shown having input connections 21 and 22. As explained in the copending application Ser. No. 212,930, the signal between inputs 21 and 22 is representative of the value log $a_1/b_1$ and accordingly, the output of absolute value circuit 20 on a conductor 23 will be indicative of |log $a_1/b_1$|. This signal is presented to the negative input terminal of a comparator 24.

FIG. 2 shows a second absolute value circuit 26 having inputs 27 and 28. As explained in the above-mentioned copending application Ser. No. 212,930, the signal between inputs 27 and 28 is representative of log $a_2/b_2$ and accordingly the output of absolute value circuit 26 on a conductor 29 will be indicative of |log $a_2/b_2$|. This signal is presented to the negative input terminal of a comparator 30. Positive input terminals of comparators 24 and 30 are connected by conductors 32 and 34 respectively to a source of reference voltage 36. The magnitude of the reference voltage is chosen to be indicative of the minimum value acceptable at the lens start position for a satisfactory contrast condition and, in FIG. 1, is represented by the solid line 7.

Comparator 24 compares the signal on conductor 23 with the reference voltage and produces a "0" output on a conductor 40 whenever the absolute value of log $a_1/b_1$ exceeds the reference voltage. If the reference voltage were to exceed the absolute value of log $a_1/b_1$, comparator 24 would operate to produce a "1" signal on conductor 40. In similar fashion, comparator 30 compares the signal on conductor 29 with the reference voltage and produces a "0" output on a conductor 42 if the absolute value of log $a_2/b_2$ exceeds the reference voltage and a "1" if the reference voltage exceeds the absolute value of log $a_2/b_2$. It is desired that a low contrast default signal occur only when both the absolute value of log $a_1/b_1$ and the absolute value of log $a_2/b_2$ are less than the reference voltage or, in other words, when a "1" signal appears on both conductors 40 and 42.

As seen in FIG. 2, conductors 40 and 42 are presented to the inputs of an AND gate 45 whose output appears on conductor 47 and a junction point 48. When both of the inputs to AND gate 45 are "1" indicative of a low contrast condition, the output on conductor 47 will be a "1" while if either or both inputs to AND gate 45 are " ", indicative of a satisfactory contrast condition, the output of AND gate 45 will be a "0". Junction point 48 is connected by a conductor 50 to the lower input terminal of an AND gate 52 and is connected by a conductor 54 to the input of an inverter 56 whose output on a conductor 58 is connected to the lower input terminal of an AND gate 60. The other input terminal 62 of AND gate 52 and the other input terminal 64 of AND gate 60 are connected to a SYNC switch circuit shown as box 66 by conductors 68 and 69 respectively. As explained in the copending application Ser. No. 212,930, when the SYNC switch is closed, a "1" signal will appear on conductors 68 and 69 and thus to the upper input terminals of amplifiers 52 and 60. When SYNC switch 66 is open, a "0" signal appears on conductors 68 and 69 and thus to the upper input terminals of AND gates 52 and 60. Accordingly, assuming a low contrast condition, and assuming that the SYNC switch 66 is closed, AND gate 52 will receive two "1" signals but because inverter 56 changes the "1" signal on conductor 54 to a "0" signal on conductor 58, AND gate 60 will receive a "0" and a "1" signal at this time. Accordingly, the output of AND gate 52 on a conductor 70 will be a "1" while the output of AND gate 60 on a conductor 72 will be a "0". The output of AND gate 52 on conductor 70 is connected to the set input of a flip-flop 76 and the output of AND gate 60 on conductor 72 is connected to the reset input of flip-flop 76. Under these circumstances, the Q output of flip-flop 76 will be a "1" on a conductor 80 which is connected to the lower input terminal of an OR gate 82. The upper input terminal of OR gate 82 is connected by a conductor 84 to a terminal 86 and receives a signal from the auto focus circuitry disclosed in the above-mentioned copending application Ser. No. 212,930, which changes state when a zero crossover signal occurs indicative of the desired focus position. It should be noted that, in the low contrast condition assumed, flip-flop 76 is set with a "1" output on conductor 80 and this condition will continue even though the SYNC switch 66 subsequently opens to change a "1" to a "0" input at the upper terminals of AND gates 52 and 60. With the signal on conductor 80 being a "1", OR gate 82 will produce a "1" signal on its output 90 which is presented to the lens moving circuitry identified as box 94 containing the letters LMC. The lens moving circuitry may be that in copending application Ser. No. 212,930, and operates to stop the motion of the focus and taking lenses of the camera after the opening of the SYNC switch provided a low contrast condition exists.

Now assuming that satisfactory contrast exists, then one or both of the signals on conductors 40 and 42 will be a "0" under which circumstances the output of AND gate 45 on conductor 47 and junction point 48 will be a "0" and, prior to SYNC switch 66 closing, both inputs to AND gate 60 will be a "1" while one input to AND gate 52 will be a "0" with the other input being a "1". Under these circumstances, a "1" signal will appear on conductor 72 to the reset input of flip-flop 76 while a "0" signal will appear on conductor 71 to the set input of flip-flop 76. The Q output of flip-flop 76 will therefore be set at a "0" and the lower input of OR gate 82 will be "0". This condition will continue even subsequent to the opening of SYNC switch 66 since although a "0" signal will then appear at the upper input terminals of AND gates 52 and 60. The output of flip-flop 76 will not change and the "0" signal on conductor 80 indicative of a satisfactory contrast will continue. With a "0" signal on the lower input of OR gate 82, the output of OR gate 82 on conductor 90 will depend upon the signal which is received from terminal 86 on conductor 89. In other words, if the signal at terminal 86 is a "0", the output of OR gate 82 will be a "0" whereas if the signal at terminal 86 is a "1", the output of OR gate 82 will be a "1". This signal is presented to the lens moving circuit 94 and as explained in the copending application Ser. No. 212,930, operates to stop the motion of the taking and focus lenses at the time when the auto focus signal crosses the zero axis thereby positioning the lens at the proper focus position.

Figure 3:
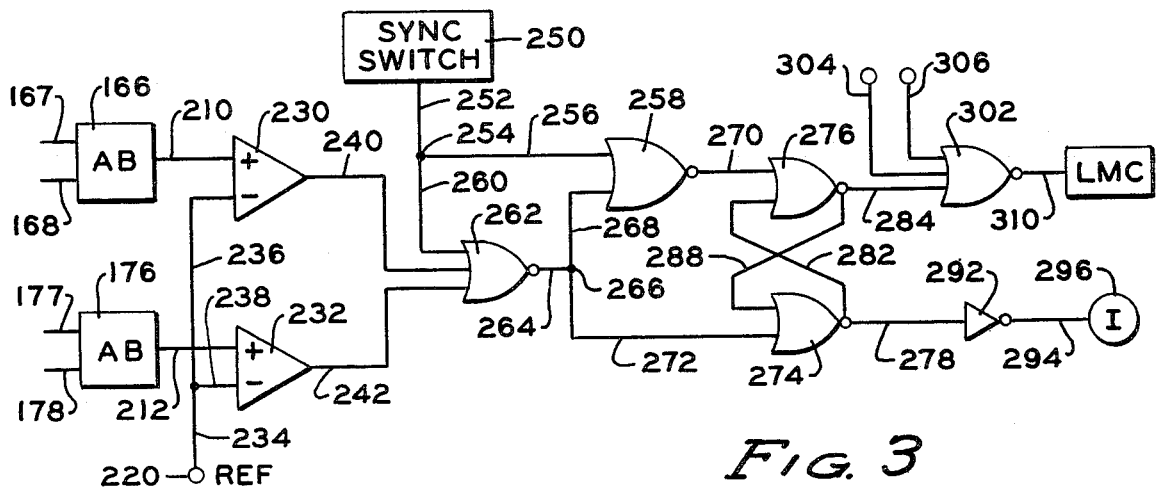
FIG. 3 shows a schematic diagram of an alternate embodiment of the circuit of the present invention.

Referring now to FIG. 3, an absolute value circuit 166 is shown having a pair of input terminals 167 and 168. As explained in the above-mentioned copending application Ser. No. 212,918, the signal between inputs 167 and 168 is representative of $\log a_1/b_1 + \log a_2/b_2$. FIG. 3 shows a second absolute value circuit 176 having a pair of inputs 177 and 178. As explained in the above-mentioned copending application Ser. No. 212,918, the signal between inputs 177 and 178 is representative of the signal $\log a_2/b_2 - \log a_1/b_1$. Accordingly, it is seen that the output of absolute value circuit 166 appearing on a conductor 210 will be representative of $|\log a_1/b_1 + \log a_2/b_2|$ while the output of absolute value circuit 176 appearing on a conductor 212 will be representative of $|\log a_2/b_2 - \log a_1/b_1|$. It is the absolute value signals appearing on conductors 210 and 212 which are used to determine whether or not the scene has sufficient contrast to provide a useable signal for use by the auto focus circuitry.

A source of reference voltage 220 is shown in FIG. 3 and is chosen to be of the value seen in FIG. 1 as reference voltage corresponding to line 7. This value is the value which has been determined to be the minimum that may exist at the lens start position as determined by the minimum slope allowable. If either the output of absolute value circuit 166 on conductor 210 or the output of absolute value circuit 176 on conductor 212 is greater than the reference voltage, then the circuit will be allowed to operate normally to determine the proper auto focus point. On the other hand, if both the output of absolute value circuit 166 on conductor 210 and the output of absolute value circuit 176 on conductor 212 are below the reference voltage, the circuit will operate to default and stop the motion of the lens at the infinity or hyperfocal extension point.

The output of absolute value circuit 166 is on a conductor 210 which is connected to the positive input of a comparator 230 and the output of absolute value circuit 176 is on a conductor 212 which is connected to the positive input of a comparator 232. The reference voltage 220 is connected by a conductor 234 and a conductor 236 to the negative input terminal of comparator 230. Reference voltage 220 is also connected by conductor 234 and a conductor 238 to the negative input terminal of comparator 232. Comparators 230 and 232 operate to compare the outputs of absolute value circuits 166 and 176 with the reference voltage and to produce a logical "0" signal if the magnitude of the reference voltage exceeds that of the output of the absolute value circuit. On the other hand, if the output of the absolute value circuit exceeds the magnitude of the reference voltage, then the outputs of amplifiers 230 and 232 will be a logical "1". More specifically, if the signal appearing at the output of absolute value circuit 166 on conductor 210 representative of $|\log a_a/b_1 + \log a_2/b_2|$ is less than the reference voltage at point 220, then the output of amplifier 230 on a conductor 240 will be a "0". On the other hand, if the magnitude of $|\log a_1/b_1 + \log a_2/b_2|$ appearing on conductor 210 is greater than the magnitude of the reference voltage appearing on conductor 236, then the output of amplifier 230 on conductor 240 will be a "1". In similar fashion, if the output of absolute value circuit 176 on conductor 212 representative of $|\log a_2/b_2 - \log a_1/b_1|$ is less than the reference voltage appearing on conductor 238, then the output of amplifier 232 appearing on conductor 242 will be a "0". If, on the other hand, the output of absolute value circuit 176 appearing on conductor 212 is greater than the reference voltage appearing on conductor 238, then the output of amplifier 232 on conductor 242 will be a "1". Thus, if either the signal appearing on conductor 240 or 242 is a "1", then the scene contrast will be sufficient to allow operation of the auto focus circuitry in the normal fashion, but if both the outputs on conductors 240 and 242 are "0", then insufficient contrast exists and the default circuitry will be operable to stop the motion of the lens at the infinity or hyperfocal extension.

A sync switch shown as box 250 is shown in FIG. 3 and operates to produce a "0" whenever the sync switch is closed and produces a "1" whenever the sync switch is open. Accordingly, while the lens is at its starting position, the default circuitry is determining whether or not the output on conductor 210 an conductor 212 is greater or lesser than the reference voltage at 220 and the output from sync switch 250 on a conductor 252 will be a "0" but after the comparison has been made and when the picture taking process proceeds to a predetermined point, the output on conductor 252 will change to a "1".

The output of sync switch 250 on conductor 252 is connected to a junction point 254 which is connected by a conductor 256 to the upper input terminal of a NOR gate 258. Junction point 254 is also connected by a conductor 260 to the upper input terminal of a NOR gate 262. The output of comparator 230 on conductor 240 is connected to the middle input of NOR gate 262 while the output of comparator 232 on conductor 242 is connected to the lower input of NOR gate 262. The output of NOR gate 262 on a conductor 264 is connected to a junction point 266 which in turn is connected by a conductor 268 to the lower input terminal of NOR gate 258. The output of NOR gate 258 appears on a conductor 270. Since a NOR gate operates to produce a "1" only when all of its inputs are a "0", the output of NOR gate 262 appearing on conductor 264 and junction point 266 will be a "1" only when the output of sync switch 250, the output of comparator 230 and the output of comparator 232 are all "0". In any other situation, that is, when either the output of sync switch 250 or the output of comparators 230 or 232 are a "1", the output of NOR gate 262 will be a "0". It is therefore seen that before the sync switch opens during which time a "0" signal appears on conductor 252, the output of NOR gate 262 will only be a "1" of both the outputs of comparators 230 and 232 are a "0". It is only when both the outputs of amplifiers 230 and 232 are "0" that a low contrast condition exists and accordingly the output of NOR gate 262 will be a "1" only when a low contrast situation exists. If there is sufficient contrast in the scene being viewed so that either the output of comparator 230 or 232 is a "1", then the output of NOR gate 262 will be a "0". Since the output of NOR gate 262 is connected to the lower input of NOR gate 258, the output of NOR gate 258 will be a "0" any time, prior to the opening of switch contact 250, that a low contrast condition exists and a "1" signal appears at the output of NOR gate 262. If sufficient contrast exists, then the output of NOR gate 262 and the lower input of NOR gate 258 will be a "0" and, prior to the sync switch 250 opening, the output of NOR gate 258 on conductor 270 will be a "1". In a low contrast situaton, the output of NOR gate 262 is a "1" and the output of NOR gate 258 is a "0" whenever the sync switch 250 has not been opened.

Junction point 266 is connected by a conductor 272 to the lower input terminal of a NOR gate 274. Conductor 270 is connected to the upper input terminal of a NOR gate 276. The output of NOR gate 274 on a conductor 278 is connected and by a conductor 282 to the lower input terminal of NOR gate 276. The output of NOR gate 276 on a conductor 284 is connected by a conductor 288 to the upper input terminal of NOR gate 274. NOR gates 274 and 276 operate as a flip-flop which, as can be seen, produces a "1" signal on conductor 284 and a "0" signal on conductor 278 whenever a low contrast situation exists but which produce a "0" on conductor 284 and a "1" on conductor 278 whenever a satisfactory contrast condition exists during the time that the sync switch is closed.

After the flip-flop comprising NOR gates 274 and 276 has been set to indicate either a low contrast or a good contrast condition, sync switch 250 will open and the signal on conductor 252 will change to a "1" thereby producing at the upper input terminal of NOR gate 258 a "1" signal. If a low contrast condition existed causing a "1" signal to appear at the lower input terminal of NOR gate 258, then the opening of sync switch 250 will have no affect and the output of NOR gate 258 on conductor 270 will remain a "0". Since the output of NOR gate 276 on conductor 284 is connected to the upper input terminal of NOR gate 274, a change to a "1" on the upper input terminal of NOR gate 262 thereby producing a "0" at its output on conductor 264 and conductors 272 connected to the lower input terminal of NOR gate 274 will have no effect and the signal on conductor 278 will remain a "0".

On the other hand, if at the time of sync switch opening a sufficient contrast situation exists, the output of NOR gate 276 on conductor 284 will be a "0" while the output of NOR gate 274 on conductor 278 will be a "1". Furthermore, the change to a "1" at the upper input terminal of NOR gate 262 will not change its output since it was already receiving a "1" from either the output of amplifier 230 or amplifier 232. The output of NOR gate 258 will change in such a situation, however, so that the output on conductor 270 becomes a "0" but since NOR gate 276 was already receiving a "1" from the output of NOR gate 274 by way of conductor 282, the output of NOR gate 276 will not change and the "0" appearing on conductor 284 and the "1" signal appearing on conductor 278 will continue. It is thus seen that the flip-flop circuit consisting of NOR gates 274 and 276 is set prior to the opening of the sync switch in a condition which produces a "1" signal on conductor 284 and a "0" signal on conductor 278 whenever a low contrast condition exists and which produces a "0" signal on conductor 284 and a "1" signal on conductor 278 whenever a satisfactory contrast situation exists and that this situation will not change after the sync switch 250 opens.

Conductor 278 is connected to an inverter 292 which has an output 294 connected to an indicator 296. Whenever a low contrast situation exists, the signal on conductor 278 will be a "0" so that the output of inverter 292 on conductor 294 will be a "1" and the indicator 296 will indicate a low contrast condition. Whenever satisfactory contrast exists, the signal on conductor 278 will be a "1" and the output of inverter 292 on conductor 294 will be a "0" to cause indicator 296 to produce a signal indicative of good contrast.

Conductor 284 is connected to the input of a NOR gate 302 which has two other inputs indicated as 304 and 306 respectively. Inputs 304 and 306 are connected to the auto focus circuitry of the above-mentioned co-pending application Ser. No. 212,918, and will not be further described here. It should be noted, however, that whenever unsatisfactory contrast exists, the output signal on conductor 284 will be a "1" which will cause the output of NOR gate 302 on a conductor 310 to be a "0". The "0" signal on conductor 310 is connected to the lens moving circuitry shown as a box 312 containing the letters LMC and will operate to stop the motion of the lens at the infinity or hyperfocal extension. If satisfactory contrast exists, the output signal on conductor 284 will be a "0" in which case NOR gate 302 will be controlled by the outputs of the auto focus circuitry appearing on conductors 304 and 306 so that the lens may be stopped at the proper focus condition.

Figure 4:
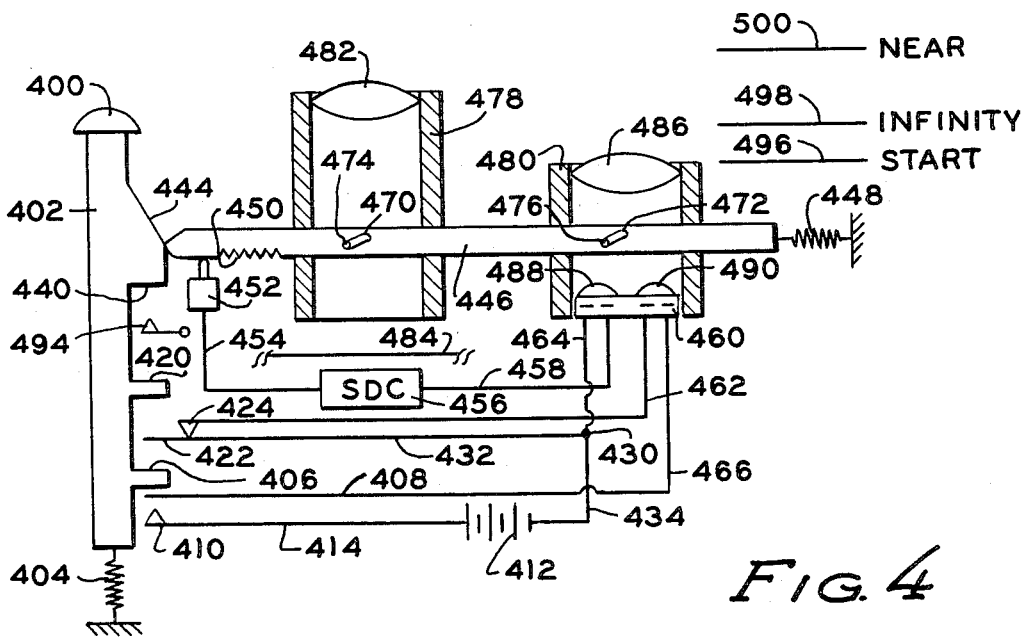
FIG. 4 shows apparatus and circuitry for moving and stopping the auto focus lens.

Turning now to FIG. 4, the apparatus for moving and stopping the focus lens of the auto focus system is shown. This apparatus is similar to that shown in the above-mentioned copending application Ser. No. 85,821. In FIG. 4, an operator's button 400 is shown connected to a shaft 402 which is biased upwardly by a spring 404. Shaft 402 has a first abutment 406 which operates when shaft 402 moves downwardly to close a power switch comprising a contact 408 and a contact 410. Contact 410 is connected to the positive terminal of a battery 412 by a conductor 414.

Shaft 402 has a second abutment 420 which operates upon motion downwards to engage a contact 422 and thus open a switch comprising contact 422 and a contact 424. Contact 402 is connected to a junction point 430 by a conductor 432 and junction point 430 is connected to the negative side of battery 412 by a conductor 434. It can be seen that the distance between abutment 420 and contact 422 is greater than the distance between abutment 406 and contacts 408 and 410 so that upon operation of shaft 402 in a downward direction the switch comprising contacts 408 and 410 will close before the switch comprising contacts 422 and 424 open. Switch contacts 410 and 408 comprise the power switch for the system and switch contacts 422 and 424 constitute the SYNC switch for the system.

Shaft 402 has a third abutment 440 which has an inclined upper side 444. A horizontal shaft 446 is biased to the left by a spring 448 and presses against abutment 440. As the operator moves shaft 402 in a downward direction, shaft 446 will begin moving along the inclined surface 444 so that the shaft 446 is allowed to move to the left by an amount dependent upon the motion of shaft 402.

Shaft 446 has at the left lower end a set of serrations or teeth 450 which operate adjacent a solenoid 452. Solenoid 452 is connected by a conductor 454 to a solenoid driver circuit 456 which may be like those shown in the above-mentioned copending application Ser. Nos. 212,930 and 212,918. Solenoid driver circuit 456 receives the output of the auto focus circuit by way of a conductor 458 connected to the circuit chip 460. Auto focus circuit chip 460 contains the radiation responsive detectors, gates and amplifiers seen in the above-referred to copending applications Ser. No. 212,930 and Ser. No. 212,918.

Switch contact 424 is also connected to the auto focus circuit chip by a conductor 462, junction point 430 is connected to the auto focus circuit chip by a conductor 464 and switch contact 408 is connected to the auto focus circuit chip by a conductor 466.

Shaft 446 has a pair of inclined orifices 470 and 472 which cooperate with pins 474 and 476 respectively to move lens housing means 478 and 480 respectively. Lens housing 478 contains the taking lens 482 of the camera which focuses an image of the scene to be recorded on a film 484. Lens housing 480 contains the focus lens 486 and operates to convey radiation from the scene being viewed to the auto focus circuit chip through a pair of lenslets 488 and 490.

It can been seen that as the operator presses the operator's button 400, shaft 402 moves downwardly first closing the power switch consisting of contacts 408 and 410 after which time, as explained above, the default circuitry determines whether or not there is sufficient contrast for the auto focus system to continue operating. If insufficient contrast exists, then as shaft 402 continues to move downwardly, it will open switch contacts 422 and 424 thereby providing the SYNC signal to the auto focus circuitry 460 and causing solenoid 452 in the first detent to serrations 450 to operate stopping the motion of shaft 446 and thus the upward motion of lens housings 478 and 480 at the infinity or preferrably hyperfocal position. If sufficient contrast exists, then upon the opening of the SYNC switch contacts 422 and 424, shaft 446 will be allowed to continue to move along slope 444 until a signal from the auto focus circuitry along conductor 458 and through the solenoid driver circuit 456 operates solenoid 452 to stop the lens housings 478 and 480 at the proper focus position. Further motion of shaft 402 in a downward direction past this point causes abutment 440 to encounter a lever 494 which lever may be connected to the shutter release mechanism of the camera so as to allow the picture to be taken.

In the upper right hand portion of FIG. 4, the focus lens 486 is shown adjacent a line 496 identified as the "start" position. As seen, this line is closer to the camera apparatus than a line 498 identified as the "infinity" position. Thus as shaft 446 moves to the left down the inclined surface 444, lenses 482 and 486 will move upwardly. The first part of the motion will be from the "start" position at which time the low contrast check is made. The result is that if insufficient contrast exists, lenses 482 and 486 will stop at the infinity or hyperfocal position. If sufficient contrast does exist, then the lenses will be allowed to move past the infinity position towards a line 500 identified as the "near" position. During this latter portion of the travel, an auto focus signal from the circuitry 460 will cause solenoid 452 to stop the further leftward motion of shaft 446 and thus stop the upward motion of lenses 482 and 486 at the proper focus position.

It is thus seen that I have provided circuitry that will respond to a low contrast situation to prevent motion of the focus lens of the system past the infinity or hyperfocal position but which will allow the auto focus circuitry to operate normally whenever good contrast exists. Many changes and modifications to the circuitry shown may be made by those skilled in the art. For example, while the system has been shown in connection with auto focus apparatus having two pairs of detectors, it will also operate to provide low contrast default if one pair of detectors were used or if three or more pairs of detectors were used. Accordingly, I do not wish to be limited to the specific disclosures used in connection with the preferred embodiment. I intend only to be limited by the following claims.

The embodiments of the invention in which an exclusive property or right is claimed are defined as follows:

1. Apparatus for use with an auto focus system which produces a first signal that is a function of the slope of a first curve determined by the values of $a_1$ and $b_1$ and a second signal that is a function of the slope of a second curve determined by the values of $a_2$ and $b_2$ where $a_1$, $b_1$, $a_2$ and $b_2$ are the outputs of two pair of radiation detectors mounted to receive radiation through focus lens means from a scene containing an object to be focused upon, the system including motive means operable to move the focus lens from a first position through a proper focus position to a second position, the scene being such that the slope of the first and second curves may be insufficient to provide satisfactory operation of the system, the improvement comprising:

a first absolute value circuit connected to receive the first signal and to produce a first output signal that is a function of the absolute value of the first signal;

a second absolute value circuit connected to receive the second signal and to produce a second output signal that is a function of the absolute value of the second signal;

comparing means connected to the first and second absolute value circuits to compare the first and second output signals with a reference signal of magnitude indicative of a value of the first and second signals considered sufficient to provide satisfactory operation of the system, said comparing means operable to produce a resultant signal having a first characteristic when the magnitude of both the first and second output signals is less than the magnitude of the reference signal and having a second characteristic when the magnitude of one of the first and second output signals is greater than the magnitude of the reference signal; and means connected to the motive means and to said comparing means to receive the resultant signal and operable to stop the motive means and to prevent further motion of the focus lens at a predetermined position when the resultant signal has the first characteristic.

2. Apparatus according to claim 1 wherein the first signal varies with $\log a_a/b_1$ and the second signal varies with $\log a_2/b_2$.

3. Apparatus according to claim 1 wherein the first signal varies with $\log a_1/b_1 + \log a_2/b_2$ and the second signal varies with $\pm \log a_1/b_1 \pm \log a_2/b_2$.

4. Apparatus according to claim 1 wherein the predetermined position is the hyperfocal extension.

5. Apparatus for use with a range finding system having lens means moveable from a first position through a second position to a third position and operable to position the lens means so as to produce a focused image of an object whose range is to be determined, the third position being away from the system so as to produce a focused image of objects relatively near to the system, the second position being close to the system so as to produce a focused image of objects at infinity and the first position being closer to the system than the second position, the apparatus producing a focus signal which has a first magnitude when the lens means is in the first position and which changes magnitude as the lens means moves toward the third position and crosses a predetermined axis when the lens means is proximate a position between the second and third position where the image of the object is in focus, the improvement comprising:

absolute value means connected to receive the focus signal and to produce an output signal indicative of the absolute value of the focus signal;

reference voltage means operable to produce a reference signal of predetermined magnitude;

comparing means connected to the absolute value means and the reference voltage means and operable to produce a resultant signal when the magnitude of the focus signal, at the time the lens means is proximate the first position, is less than the magnitude of the reference signal; and motive means connected to said comparing means and to the lens means and operable to stop the lens means proximate the second position upon receipt of a resultant signal.

6. In an auto focus system for a camera having a lens for receiving radiation from an object in a scene being viewed, the lens means being moveable through a range between a first position where objects located far from the camera will be in focus and a second position where objects located near to the camera will be in focus, the system including radiation responsive detector means operable to receive radiation from the object through the lens means and to produce an output signal having a slope dependent upon the contrast in the scene being viewed, the improvement comprising:

means positioning the lens means at a third position outside of the range at a time prior to the operation of the auto focus system;

reference means for producing a reference signal of predetermined magnitude;

comparing means receiving the output signal and the reference signal and producing a comparison signal when the magnitude of the reference signal is greater than the output signal at the time prior to the operation of the auto focus system; and means connected to the comparing means and to the lens means and operable upon receipt of a comparison signal to position the lens means proximate the first position.

7. Apparatus for use with an auto focus camera having moveable lens means and means for moving the lens means between a first position close to the camera where an object when located at a far distance in a scene being viewed will be properly focused and a second position further away from the camera where the object when located at a near distance will be properly focused, the improvement comprising:

sensing means positioned to receive radiation from the scene being viewed to produce a default signal when the contrast is insufficient and connected to the means for moving the lens to stop the lens near the first position upon the occurrence of a default signal; and means mounting the lens initially at a third position closer to the camera than the first position to permit the sensing means to detect the contrast condition prior to the lens reaching the first position.

8. Apparatus according to claim 7 wherein the sensing means includes radiation responsive means having a curve of output values which vary from a first value when the lens is in the first position to a second value when the lens is in a position where the object is properly focused and the slope of the curve between the first value and the second value is indicative of the contrast in the scene being viewed.

9. Apparatus according to claim 8 including reference means producing a reference signal having a predetermined value and wherein the sensing means determines the slope of the values by comparing the value of the output with the predetermined value when the lens is proximate the third position, the default signal being indicative that the reference signal is greater.

* * * * *